US010532627B2

(12) United States Patent
Philippin et al.

(10) Patent No.: US 10,532,627 B2
(45) Date of Patent: Jan. 14, 2020

(54) FASTENING ARRANGEMENT

(71) Applicant: Mahle International GmbH, Stuttgart (DE)

(72) Inventors: Erich Philippin, Ditzingen (DE); Ulrich Schneider, Heilbronn (DE)

(73) Assignee: Mahle International GmbH (DE)

( * ) Notice: Subject to any disclaimer, the term of this patent is extended or adjusted under 35 U.S.C. 154(b) by 125 days.

(21) Appl. No.: 15/319,796

(22) PCT Filed: Jun. 17, 2015

(86) PCT No.: PCT/EP2015/063626
§ 371 (c)(1),
(2) Date: Dec. 18, 2016

(87) PCT Pub. No.: WO2015/193386
PCT Pub. Date: Dec. 23, 2015

(65) Prior Publication Data
US 2017/0136846 A1    May 18, 2017

(30) Foreign Application Priority Data
Jun. 18, 2014 (DE) .......................... 10 2014 211 768

(51) Int. Cl.
*B60H 1/00* (2006.01)
*F16M 13/02* (2006.01)
(52) U.S. Cl.
CPC ......... *B60H 1/00521* (2013.01); *F16M 13/02* (2013.01); *F16B 2200/403* (2018.08)
(58) Field of Classification Search
USPC ...... 248/500, 506, 510, 65, 72, 73, 70, 74.1, 248/74.4; 403/408.1; 446/330, 228, 462
See application file for complete search history.

(56) References Cited

U.S. PATENT DOCUMENTS 6,717,815 B2 * 4/2004 Yang ................... H01L 23/4006
                                                        248/510
7,042,719 B2 * 5/2006 Lai .......................... G06F 1/203
                                                        257/E23.084
(Continued)

FOREIGN PATENT DOCUMENTS

DE     69608650 T2    2/2001
DE     20309961 U1    11/2004
(Continued)

OTHER PUBLICATIONS

English abstract for DE-10325502.
(Continued)

*Primary Examiner* — Alfred J Wujciak
(74) *Attorney, Agent, or Firm* — Fishman Stewart PLLC

(57) ABSTRACT

A fastening arrangement for fastening at least two components together may be utilized in a motor vehicle. The fastening arrangement may include a plurality of screw-on brackets provided on a first component, and a number of retaining pegs provided on a second component. The screw-on brackets may include a through hole that may receive a respective projection of the number of retaining pegs when the first component and the second component are assembled with one another. At least one retaining pegs may include a cover plate that may facilitate receiving an associated screw-on bracket laterally and clip the screw-on bracket between the at least one retaining peg and the cover plate. A screw-in peg having a screw-in opening may be disposed on the second component. A hold-down may be securable to the screw-in peg to secure an associated screw-on bracket and an associated retaining peg.

20 Claims, 2 Drawing Sheets

(56) References Cited

U.S. PATENT DOCUMENTS

| | | | | |
|---|---|---|---|---|
| 7,333,341 | B2* | 2/2008 | He | H01L 23/4006 |
| | | | | 165/121 |
| 7,652,886 | B2* | 1/2010 | Li | H01L 23/4006 |
| | | | | 165/80.3 |
| 7,817,427 | B2* | 10/2010 | Li | F16B 13/065 |
| | | | | 165/185 |
| 2006/0249636 | A1* | 11/2006 | Thiedig | F16L 3/1091 |
| | | | | 248/74.4 |
| 2012/0205499 | A1* | 8/2012 | Shelton | F16L 3/1091 |
| | | | | 248/62 |
| 2013/0340982 | A1 | 12/2013 | Johnson et al. | |
| 2016/0116083 | A1* | 4/2016 | Olsen | F16B 2/06 |
| | | | | 248/74.1 |

FOREIGN PATENT DOCUMENTS

| | | | |
|---|---|---|---|
| DE | 10325502 A1 | 12/2004 | |
| DE | 10328894 A1 | 1/2005 | |
| FR | 2728653 A1 | 6/1996 | |
| WO | WO-00/54996 A1 | 9/2000 | |
| WO | WO-2012140534 A1 * | 10/2012 | H01M 2/1016 |

OTHER PUBLICATIONS

English abstract for DE-10328894.
English abstract DE-20309961.
English abstract DE-69608650.
English abstract for FR-2728653.

* cited by examiner

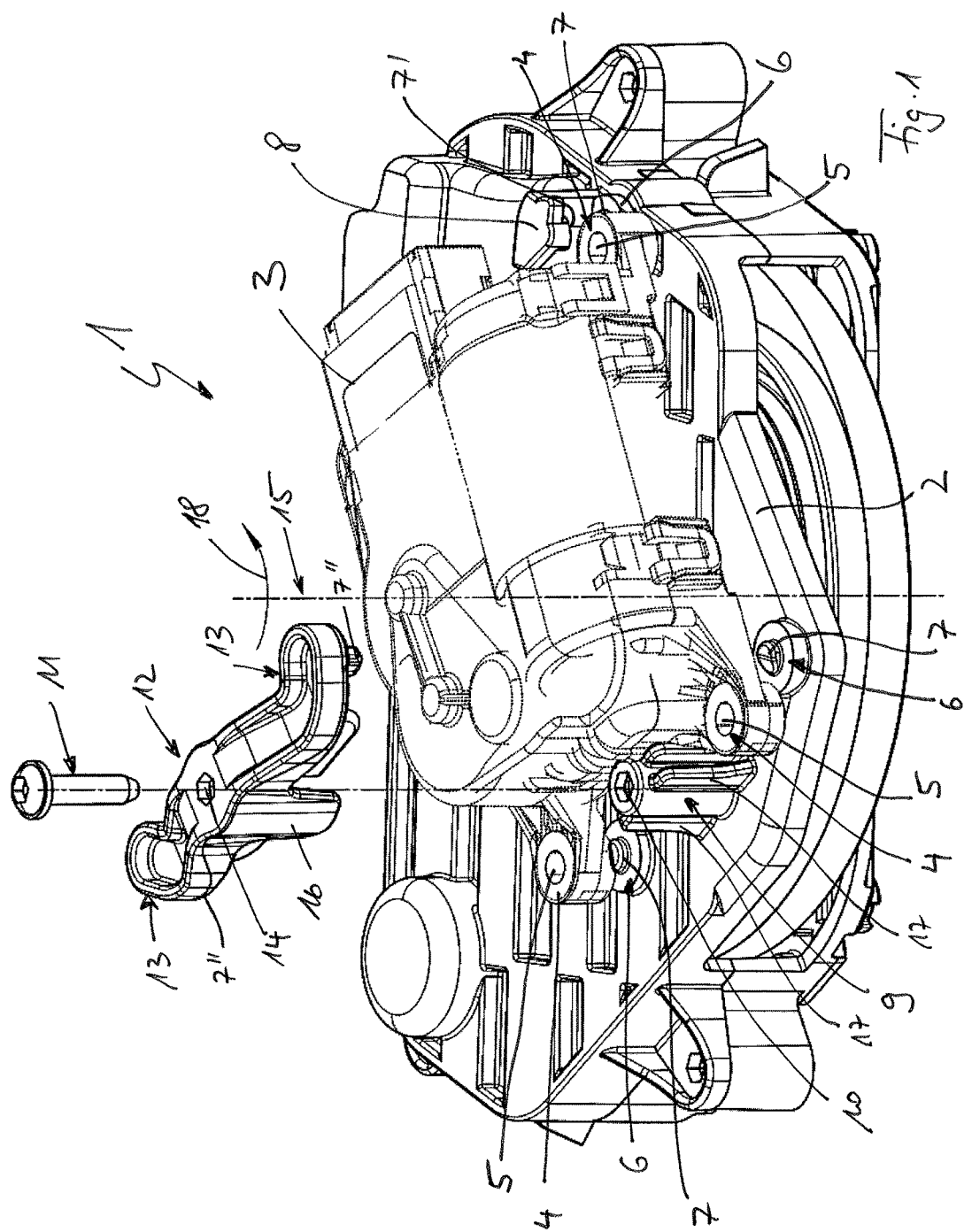

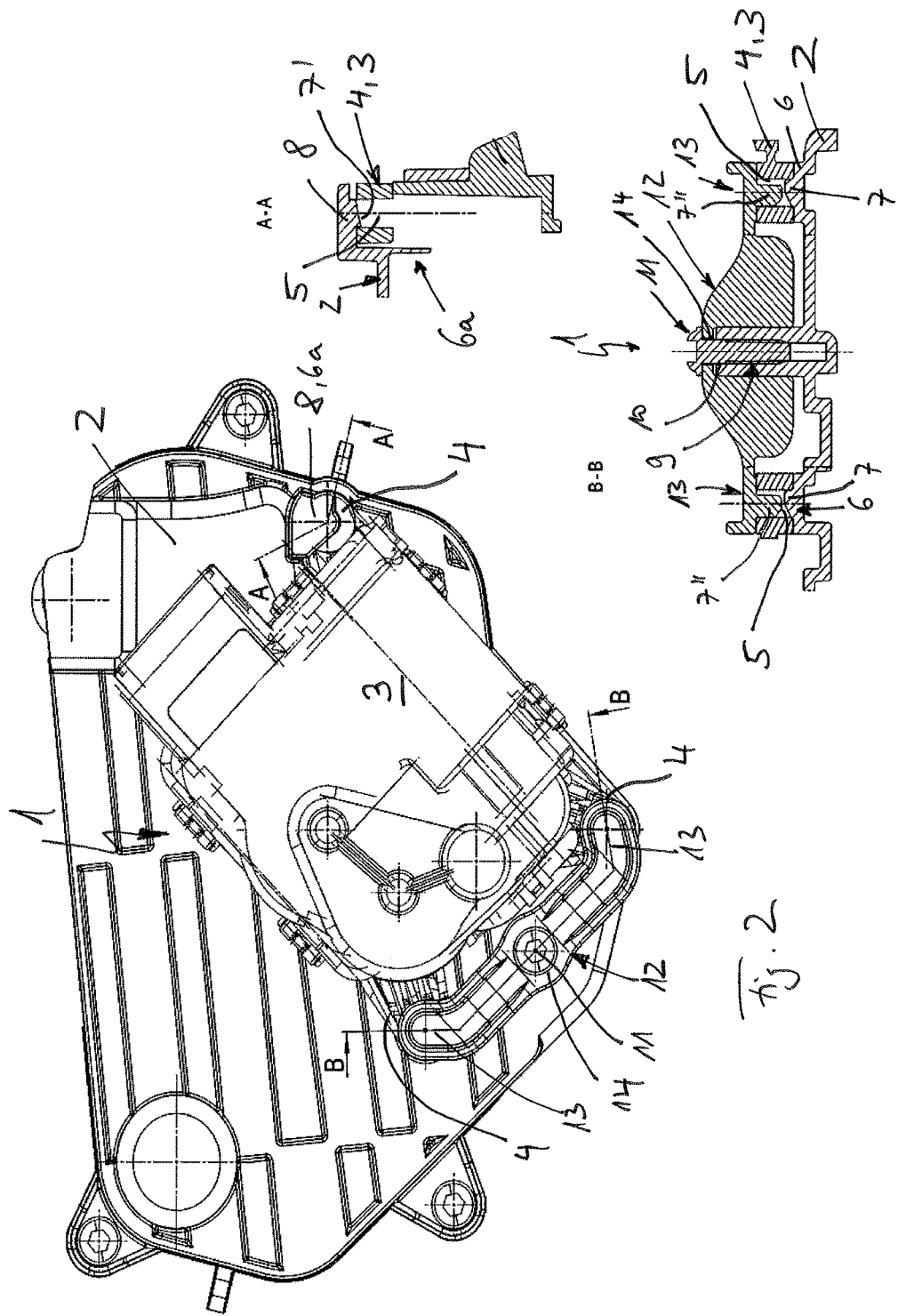

FASTENING ARRANGEMENT

CROSS-REFERENCE TO RELATED APPLICATIONS

This application claims priority to German Patent Application No. 10 2014 211 768.2, filed Jun. 18, 2014, and International Patent Application No. PCT/EP2015/063626, filed Jun. 17, 2015, both of which are hereby incorporated by reference in their entirety.

TECHNICAL FIELD

The present invention relates to a fastening arrangement for fastening a first component to a second component. Moreover, the invention relates to a motor vehicle having at least one fastening arrangement of this type.

BACKGROUND

DE 103 25 502 A1 has disclosed a motor, in particular an electric motor for adjusting individual motor vehicle components with fastening options which are arranged correspondingly on the motor housing thereof and with the aid of which the motor can be fastened to another component by means of screws. Here, a plurality of fastening options of this type are provided on the motor housing. Unequivocal fixing of the motor on the other component is generally possible here via three fastening screws, with the result that the fourth fastening option which is not utilized is intended to provide increased flexibility. Up to now, electric motors have been used in climate control systems for controlling functions, which electric motors are as a rule screwed to a component of the climate control system. Here, the screw attachment usually takes place via two screws and two retaining pegs or by means of three screws of this type. If, however, reliable fastening of an electric motor of this type to a component of the climate control system is required in the case of an available installation space height which is extremely low at the same time, the fastening method which has been known up to now from the prior art does not lead to success.

SUMMARY

The present invention is therefore concerned with the problem of specifying a fastening arrangement for fastening a first component to a second component, from which fastening arrangement, in particular, a reduced overall height can be achieved.

According to the invention, said problem is solved by way of the subjects of the independent claims. Advantageous embodiments are the subject matter of the dependent claims.

The present invention is based on the general concept of fastening a first component to a second component, for example a motor housing of an electric motor for adjusting functional elements of a climate control system to a housing of the climate control system, via three fastening points, one of said three fastening points being configured as a clip connection and the fixing at the two other fastening points being brought about by means of a hold-down according to the invention which is fixed via merely a single fastening screw on an elevated screw-in peg on the second component. The modified fastening arrangement according to the invention can achieve a considerably reduced fastening means with regard to its required installation space height, which is of great advantage, in particular, in modern engine compartments. Here, according to the invention, at least three screw-on brackets with corresponding through openings are provided in a lower region of the first component, whereas a number of retaining pegs which corresponds to the number of through openings is provided on the second component, which retaining pegs, when the components are assembled with one another, engage with corresponding projections into the respectively associated through openings of the first component. Moreover, at least one of the retaining pegs has a cover plate which makes it possible to push in the associated screw-on bracket of the first component laterally and to clip it between the retaining peg and the cover plate. It is possible in principle to understand the term "cover plate" to also mean one or more housing parts. In addition, a screw-in peg which is elevated in comparison with the retaining pegs is provided on the second component with a screw-in opening for a fastening screw, it being possible for the hold-down to be fixed in the screw-in opening by way of the fastening screw in such a way that, by way of at least one of its arms, it presses down an associated screw-on bracket of the first component onto an associated retaining peg of the second component and fixes it as a result. It is now no longer necessary as was previously customary for three screw connections to be tightened in order to fasten the first component to the second component, but rather merely a single screw connection and the clip connection which is provided on the third screw-on bracket, as a result of which the assembly operation is also simplified considerably.

In one advantageous development of the solution according to the invention, the first component is configured as a motor housing and the second component is configured as a climate control system housing. Electric motors which have to be fastened in a corresponding manner are used in modern motor vehicles, in particular, for adjusting functional elements, such as fan flaps or air guiding elements. The fastening arrangement according to the invention which is described in the previous paragraph can be used for fastening an electric motor of this type via its motor housing to a climate control system housing.

The hold-down according to the invention is expediently configured as an injection molded plastic part. A configuration of the hold-down as an injection molded plastic part firstly provides a comparatively inexpensive and simple production option for the hold-down, in particular in the case of large quantities, and secondly additionally permits a shape which can be selected virtually as desired.

In a further advantageous embodiment of the solution according to the invention, on its at least one arm, the hold-down has a projection which, when the hold-down is mounted, engages into the associated through opening of the screw-on bracket and fixes the latter as a result. In the mounted state, the projection which is arranged on the arm of the hold-down therefore engages from above into the through opening of the screw-on bracket, and the projection of the retaining peg engages from below, as a result of which the screw-on bracket with its round through opening can be fixed reliably not only in the axial direction, but rather also in the radial direction.

The hold-down expediently has guide elements, via which it can be guided and held with respect to the screw-in peg on the second component. Guide elements of this type facilitate, in particular, the assembly operation during fastening of the first component to the second component. At the same time, guide elements of this type can also be used to stiffen the hold-down, in particular if they establish connections to the at least one arm of the hold-down and stiffen the latter as a result.

Further important features and advantages of the invention result from the subclaims, from the drawings and from the associated description of the figures using the drawings.

It goes without saying that the features which are mentioned in the above text and are still to be explained in the following text can be used not only in the respectively specified combination, but rather also in other combinations or on their own, without departing from the scope of the present invention.

BRIEF DESCRIPTION OF THE DRAWINGS

Preferred exemplary embodiments of the invention are shown in the drawings and will be explained in greater detail in the following description, identical designations relating to identical or similar or functionally identical components.

In the drawings, in each case diagrammatically:

FIG. 1 shows an exploded illustration of a fastening arrangement according to the invention, and FIG. 2 shows a plan view and different sectional illustrations through the fastening arrangement according to the invention.

DETAILED DESCRIPTION

In accordance with FIGS. 1 and 2, a fastening arrangement 1 according to the invention has a second component 2 and a first component 3 which can be fastened thereto. The first component 3 can be configured, for example, as a motor housing of an electric motor, in particular for adjusting functional elements of a ventilation or climate control system of a motor vehicle, whereas the second component 2 can be configured as a climate control system housing. Here, at least three screw-on brackets 4 with through openings 5 are provided in a lower region of the first component 3, whereas a number of retaining pegs 6 which corresponds to the number of through openings 5 is provided on the second component 2, which retaining pegs 6, when the components 2, 3 are assembled with one another, engage with corresponding projections 7 into the respectively associated through openings 5 of the first component 3. At least one of the retaining pegs 6 (here, the retaining peg 6a) has a cover plate 8 which makes it possible to push in the associated screw-on bracket 4 laterally and to clip it between the retaining peg 6a and the cover plate 8. Here, the term "clip" is intended to be understood to mean, in particular, the possibility of the ability to support a torque or tilting moment. Moreover, a screw-in peg 9 which is elevated in comparison with the retaining pegs 6 is provided on the second component 2 with a screw-in opening 10 for a fastening screw 11, via which a hold-down 12 with at least one arm 13, here even with two arms 13, can be fixed on the second component 2. The hold-down 12 itself likewise has a through opening 14, through which the fastening screw 11 can be guided and can be screwed into the screw-in opening 10 on the screw-in peg 9 of the second component 2. Here, the hold-down 12 can be fixed in the screw-in opening 10 by way of the fastening screw 11 in such a way that, by way of its at least one arm 13, here by way of both arms 13, it fixes in each case an associated screw-on bracket 4 of the first component 3 on an associated retaining peg 6 of the second component 4. Therefore, merely a single fastening screw 11 is required to fasten the second component 3 on the first component 2, which fastening screw 11, in conjunction with the clip connection and the hold-down 12, makes reliable and secure fixing of the component 3 on the second component 2 possible, in particular supporting of a torque or tilting moment.

In order to fix the first component 3 on the second component 2, said first component 3 is first of all placed onto the second component 2 and rotated about its axis 15 which can correspond, for example, to a motor axis, until the screw-on bracket 4 latches in between the cover plate 8 and the retaining peg 6 which is arranged below it. In this position, a projection 7' which is arranged on the bottom on the cover plate 8 engages from above into the through opening 5, whereas a projection 7 which is arranged on the retaining peg 6 engages from below into the through opening 5. This can be seen, for example, particularly clearly in the section A-A from FIG. 2. As a result, in particular, securing against undesired tilting and/or rotation can be achieved, it also once again being the case here that the cover plate can be at least one housing part. When this end position is reached, the projections 7 which are arranged on the other retaining pegs 6 also engage from below into the respectively associated through openings 5 of the associated screw-on bracket 4 and fix the first component 3 as a result. Here, the projections 7, 7' are of wedge-shaped configuration and allow the screw-on brackets 4 to be pushed in in the rotational direction 18, but prevent the screw-on brackets 4 from slipping out counter to the rotational direction 18. Subsequently, the hold-down 12 can be plugged onto the screw-in peg 9 and can be fixed by means of the fastening screw 11, the projections 7" which are arranged on the arm 13 of the hold-down 12 engaging in this case from above into the through opening 5 of the screw-on brackets 4 and fixing them as a result, which can be seen particularly clearly from the sectional illustration B-B according to FIG. 2.

In general, the hold-down 12 can be configured as an injection molded plastic part and, as a result, cannot only be produced inexpensively, but rather also in a correspondingly flexible manner in the case of a corresponding configuration of the plastic injection molding die.

In the case of the fastening arrangement 1 which is shown in FIGS. 1 and 2, the first component 3 has a total of three screw-on brackets 4, it going without saying that a first component 3 with four screw-on brackets 4 is also conceivable. In the embodiments which are shown, the hold-down 12 has two arms 13, and a cover plate 8 is arranged on one of the retaining pegs 6, which cover plate 8 makes it possible to push in the associated screw-on bracket 4 laterally and to clip it between the retaining peg 6 and the cover plate 8, that is to say, in particular, makes support against a torque or tilting moment possible. In order for it to be possible to achieve exact placing of the hold-down 12 on the screw-in peg 9, the hold-down 12 has guide elements 16, via which it is guided and at the same time held with respect to the screw-in peg 9. The screw-in peg 9 can be stiffened by way of lateral stiffening ribs 17.

Reliable and secure fixing of the first component 3 on the second component 2 by way of only a single fastening screw 11 is possible by way of the fastening arrangement 1 according to the invention, which fastening screw 11 fixes two screw-on brackets 4 of the first component 3 on the second component 2 at the same time via the hold-down 12 which is provided according to the invention. Reliable fixing of the screw-on brackets 4 in the region of the retaining pegs 6 can be achieved by the projections 7, 7' and 7" which are arranged on the retaining peg 6, on the cover plate 8 and on the arms 13. It is additionally of particular significance in the case of the fastening arrangement 1 according to the invention that a particularly low overall height can be achieved by way of said fastening arrangement 1. Here, the projections 7, 7' are configured as beveled pins which permit latching merely if the first component 3 is screwed in about its axis 15 in the direction 18, that is to say counter to the clockwise direction in the present case, but make it necessary to release the respective holding points during disassembly, that is to say cannot be unlatched readily by being rotated backward.

The invention claimed is:

1. A fastening arrangement for fastening at least two components together, comprising:
   a plurality of screw-on brackets provided in a lower region of a first component, each screw-on bracket having a through hole;
   a plurality of retaining pegs provided on a second component, each retaining peg including a projection corresponding to the through hole of a respective screw-on bracket of the plurality of screw-on brackets, wherein the projection of each retaining peg engages into the through hole of the respective screw-on bracket when the first component and the second component are assembled with one another;
   a cover plate configured to be positioned over at least one retaining peg of the plurality of retaining pegs, wherein the cover plate is configured to receive a corresponding screw-on bracket of the plurality of screw-on brackets laterally and to clip the corresponding screw-on bracket between the at least one retaining peg and the cover plate;
   a screw-in peg provided on the second component and disposed elevated in comparison with the plurality of retaining pegs, the screw-in peg having a screw-in opening for a fastening screw; and
   a hold-down provided with a through opening and at least one arm;
   wherein the hold-down is securable to the screw-in peg via the fastening screw such that the at least one arm fixes one of the retaining pegs of the plurality of retaining pegs to the respective screw-on bracket.

2. The fastening arrangement as claimed in claim 1, wherein at least one of the first component includes a motor housing and the second component includes a climate control system housing.

3. The fastening arrangement as claimed in claim 1, wherein the hold-down is configured as an injection molded plastic part.

4. The fastening arrangement as claimed in claim 1, wherein:
   the plurality of screw-on brackets includes at least three screw-on brackets provided on the first component;
   the hold-down includes a two-arm hold-down; and
   the cover plate facilitates a push in movement of the corresponding screw-on bracket laterally and to clip the corresponding screw-on bracket between the retaining peg and the cover plate.

5. The fastening arrangement as claimed in claim 1, wherein the hold-down includes a projection disposed on the at least one arm, and wherein the projection engages into the through opening of the associated screw-on bracket to fix the associated screw-on bracket when the hold-down is mounted.

6. The fastening arrangement as claimed in claim 1, wherein the hold-down includes a projection disposed on the at least one arm, and wherein the projection engages into the through opening of the associated screw-on bracket when the first component is mounted.

7. The fastening arrangement as claimed in claim 1, wherein the hold-down includes a guide element arranged to guide and hold the hold-down with respect to the screw-in peg.

8. The motor vehicle as claimed in claim 7, wherein the hold-down includes a guide element arranged to guide and hold the hold-down with respect to the screw-in peg.

9. The fastening arrangement as claimed in claim 1, wherein the hold-down includes another arm provided with another through opening.

10. The fastening arrangement as claimed in claim 1, wherein the hold-down includes a projection disposed on the at least one arm.

11. A motor vehicle, comprising:
    a first component;
    a second component;
    a fastening arrangement for fastening the first component and the second component together, the fastening arrangement including:
    a plurality of screw-on brackets disposed in a lower region of the first component, the plurality of screw-on brackets having a respective through hole;
    a plurality of retaining pegs disposed on the second component, the plurality of retaining pegs including a respective projection, wherein the respective projection of the plurality of retaining pegs engages into the respective through hole of a corresponding one of the plurality of screw-on brackets when the first component and the second component are assembled with one another;
    a cover plate configured to be positioned over at least one retaining peg of the plurality of retaining pegs, the cover plate configured to receive a respective one of the plurality of screw-on brackets laterally and to clip the respective one of the plurality of screw-on brackets between the at least one retaining peg and the cover plate;
    a screw-in peg provided on the second component and disposed elevated in relation to the plurality of retaining pegs, the screw-in peg having a screw-in opening; and
    a hold-down provided with a through opening and at least one arm;
    wherein the hold-down is securable in the screw-in opening of the screw-in peg by a fastener such that the at least one arm fixes an associated screw-on bracket and an associated retaining peg.

12. The motor vehicle as claimed in claim 11, wherein a number of the plurality of retaining pegs corresponds to a number of through openings provided on the plurality of screw-on brackets.

13. The motor vehicle as claimed in claim 11, wherein the first component includes a motor housing.

14. The motor vehicle as claimed in claim 11, wherein the second component includes a climate control housing.

15. The motor vehicle as claimed in claim 11, wherein the hold-down is structured as an injection molded plastic part.

16. The motor vehicle as claimed in claim 11, wherein the hold-down includes another arm provided with another through opening.

17. The motor vehicle as claimed in claim 11, wherein the hold-down includes a projection disposed on the at least one arm.

18. The motor vehicle as claimed in claim 17, wherein the projection engages into the through opening of the associated screw-on bracket when the hold-down is mounted.

19. The motor vehicle as claimed in claim 17, wherein the projection engages into the through opening of the associated screw-on bracket when the first component is mounted.

20. A fastening arrangement for a motor vehicle, comprising:
- a first component;
- a second component;
- a plurality of screw-on brackets disposed in a lower region of the first component, the plurality of screw-on brackets having a respective through hole;
- a plurality of retaining pegs disposed on the second component, the plurality of retaining pegs including a respective projection, wherein the respective projection of the plurality of retaining pegs engages into the respective through hole of a corresponding one of the plurality of screw-on brackets when the first component and the second component are assembled with one another;
- a cover plate configured to be positioned over at least one retaining peg of the plurality of retaining pegs, the cover plate configured to receive a respective one of the plurality of screw-on brackets laterally and to clip the respective one of the plurality of screw-on brackets between the at least one retaining peg and the cover plate;
- a screw-in peg provided on the second component and disposed elevated in relation to the plurality of retaining pegs, the screw-in peg having a screw-in opening; and
- a hold-down provided with a through opening and at least one arm;
- wherein the hold-down is securable in the screw-in opening of the screw-in peg by a fastener such that the at least one arm fixes an associated screw-on bracket and an associated retaining peg.

* * * * *